United States Patent
Kadkhodayan

(10) Patent No.: US 7,125,535 B2
(45) Date of Patent: Oct. 24, 2006

(54) METHOD OF PREPARING ANHYDROUS MANGANESE CHLORIDE

(75) Inventor: Abbas Kadkhodayan, Collinsville, IL (US)

(73) Assignee: Afton Chemical Corporation, Richmond, VA (US)

( * ) Notice: Subject to any disclaimer, the term of this patent is extended or adjusted under 35 U.S.C. 154(b) by 3 days.

(21) Appl. No.: 10/798,210

(22) Filed: Mar. 11, 2004

(65) Prior Publication Data

US 2005/0201923 A1 Sep. 15, 2005

(51) Int. Cl.
*C01B 9/02* (2006.01)

(52) U.S. Cl. .................. 423/491; 423/492; 423/49
(58) Field of Classification Search ........... 423/491, 423/492, 49

See application file for complete search history.

(56) References Cited

U.S. PATENT DOCUMENTS

| | | | | |
|---|---|---|---|---|
| 2,752,299 A | * | 6/1956 | Cooper | 205/74 |
| 3,453,187 A | | 7/1969 | Slatin | |
| 3,681,499 A | * | 8/1972 | Malen et al. | 514/357 |
| 3,719,679 A | * | 3/1973 | Boissier et al. | 544/381 |
| 3,951,647 A | * | 4/1976 | Cardwell et al. | 75/625 |
| 4,029,754 A | | 6/1977 | Sata et al. | |
| 4,157,285 A | * | 6/1979 | Winand | 205/370 |
| 5,504,250 A | * | 4/1996 | Kessels | 562/863 |
| 6,225,464 B1 | * | 5/2001 | Hiler et al. | 540/450 |

FOREIGN PATENT DOCUMENTS

GB 680710 10/1952

OTHER PUBLICATIONS

Babor, J.A., "Basic College Chemistry", Second edition, Apr. 1953, pp. 255-260.*
Kirk-Othmer Encyclopedia of Chemical Technology, Third Ed., Vo. 14. pp. 862-879.
Marcy, H., in Matthes, F., and Wehner, G., eds., Anorganisch-Technische Verfahren, VEB Dutscher Verlang fur Grundstoffindustrie, Leipzig, DDR, 1964, pp. 721-766.
R.J. Meyer, E.H.E. Pietsch, A. Kotowski: "Gmelin Handbuch der Anorganischen Chemie, Mangan-Halogenverbindungen, 8. Auflage," 1978, SPRINGER VERLAG, Heidelberg—New York, XP002335782; p. 4, para. 5.2.2—p. 5, para 5.2.2.2.2.
Abstract: Database WPI, Section Ch, Week 200259: Derwent Publications Ltd., London, GB; Class E12, AN 2002-555860, XP002335789, & RU 2 183 194 C2 (As Russia Urals High Temp Electrochem); Jun. 10, 2002.
Abstract: Database WPI, Section CH, Week 200231; Derwent Publications Ltd., London, GB; Class E31, AN 2002-266724, XP002335790, & RU 2 179 529 C1 (As Russia Urals High Temp Electrochem); Feb. 20, 2002.
Horvath, B., Moseler, R., and Horvath, E.G.: "Manganese (II) Silylamides," Z. Anorg. Allg. Chem., vol. 450, 1979, pp. 165-177, XP002335781; p. 166, para, II—p. 167, line 16—p. 173, para III.3.1.—para 9 III.3.2.

* cited by examiner

*Primary Examiner*—Ngoc-Yen Nguyen
(74) *Attorney, Agent, or Firm*—Dennis H. Rainear

(57) ABSTRACT

An efficient process for forming anhydrous metal halides includes the reaction of a metal powder with a hydrogen halide under anhydrous conditions. In one example, manganese powder is reacted with hydrogen chloride under anhydrous reaction conditions.

3 Claims, No Drawings

METHOD OF PREPARING ANHYDROUS MANGANESE CHLORIDE

The field of the present invention is an efficient process for forming anhydrous metal halides including, for instance, manganese chloride. The process includes the reaction of a metal powder with a hydrogen halide under anhydrous conditions.

BACKGROUND

Conventional techniques for making metal halide compounds usually involve synthesis either in an aqueous medium that often gives the product as a hydrate, or, when the halogen is chloride, chlorination of the pure metal at 700–1000° C. with chlorine gas. In the case of $MnCl_2$ synthesis, the starting material that is reacted with $HCl_{(aqueous)}$ is usually the pure manganese metal, oxide, hydroxide, or carbonate. If subsequent use of the metal halide involves application of a moisture sensitive reducing agent such as an alkali, or alkaline earth metal, or their respective alkyl derivatives, then the metal halide starting material has to be completely water free. This means the metal halide has to be separated both from the aqueous solvent, and from any water of hydration. In the case of $MnCl_2$, the product is filtered from the aqueous media to give the solid tetrahydrate $MnCl_2.4H_2O$. This tetrahydrate is then first dried in a rotary drier below its melting point of 58° C. to remove solvent, then the temperature is increased to above 200° C. to dehydrate the solid to the anhydrous $MnCl_2$. This heating is an energy intensive step that significantly increases the cost and decreases the economic efficiency in the formation of manganese chloride and other metal halides.

SUMMARY

The process herein can be used to synthesize anhydrous metal halides. If the target metal halides are to be used as starting material in a subsequent synthesis of other more useful metal compounds, then this method facilitates in-situ preparation of the metal halide that is devoid of the energy intensive dehydration stage to remove solvent water and water of hydration. Anhydrous metal halides are useful starting materials in the synthesis of low-valent metal compounds used in both heterogeneous and homogeneous catalysis, and other useful low valent forms for commercial applications.

In one example, a method of forming manganese chloride comprises the step of reacting a manganese metal powder with hydrogen chloride under anhydrous reaction conditions.

In another example, a method of forming anhydrous manganese chloride comprises the steps of providing manganese metal powder, providing hydrogen chloride, and reacting the manganese metal powder with the hydrogen chloride under anhydrous reaction conditions.

DETAILED DESCRIPTION

One example of an anhydrous metal halide formed from the process herein is anhydrous manganese (II) chloride, prepared in high yield, under an inert atmosphere in dimethyl carbitol (DMC) solvent by heating and vigorous agitation of manganese powder with hydrogen chloride dissolved in DMC. The reaction is summarized in Equation 1.

$$Mn_{(solid)} + 2HCl_{(gas)} \rightarrow MnCl_{2\ (solid)} + H_{2\ (gas)} \quad [1]$$

There are at least several methods for preparing this anhydrous manganese chloride. Thus, the preparation of this product may be carried out under a range of different reaction conditions.

One variable process condition is the pressure under which the reaction proceeds. The reaction may be carried out at atmospheric pressure, but reaction at higher pressures is preferred because of resulting higher reaction rates. It is believed that the reaction rate is directly proportional to reactor pressure. It has been determined that 100 psig pressure is a favorable reaction condition. In one example, the reaction pressure range is between about 0 to about 200 psig.

Another variable reaction condition is temperature of reaction. A favorable reaction temperature is about 100° C. In another example, the reaction temperature is between about 50° C. to about 200° C.

A further variable reaction condition is the size of the manganese or other metal powder in the reaction. The smaller the particle size, the higher the reaction rate. Accordingly, the reaction rate is inversely proportional to the manganese or other metal particle size. In one example, the powder may be of a mesh size in the range of about 50 to about 400.

The hydrogen chloride (or other hydrogen halide) of the present reaction may be dissolved in an ether solvent for the reaction. It is critical that the solvent is devoid of water. One type of ether solution that may be used is dimethyl carbitol (DMC). Other types of solvents include; ethers such as dimethyl ether (DME), butyl ether, amyl ether, di-n-butyl ether; glyme polyethers such as, diethylene glycol methyl ether (DGME), triethylene glycol dimethyl ether (triglyme), diethylene glycol dimethyl ether (diglyme), 1,2-dimethoxyethane (glyme), Cetaner (a blend of 96% glyme and 4% dimethoxymethane), ethylene glycol mono-tert-butyl ether, ethylene glycol mono-n-butyl ether; carbonates such as dimethyl carbonate and diethyl carbonate; di-acetates such as ethylene glycol acetate; acetals such as dimethoxymethane (DMM or methyl-al), 2-ethylhexylacetate; esters of plant and animal oils such as methyl soyate.

The manganese powder may be charged into a DMC solution saturated with HCl (2–33 wt %) while agitated vigorously. Also, HCl can be introduced into a reactor through a bubbler containing HCl saturated DMC/Mn slurry solution. The $MnCl_2$ product cake comprises of $MnCl_2$ (10–50 wt %) and DMC (0–60 wt %) which can be dried at 150° C. by vacuum rotary evaporation.

As illustrated in Equation 2, the process described herein can be used to synthesize other anhydrous metal halides. If the target metal halides are to be used as starting materials in a subsequent synthesis of other more useful metal compounds, then this method facilitates in-situ preparation of the metal halides that are devoid of the energy intensive dehydration stage necessary to remove solvent water and water of hydration.

$$M_{(solid)} + nHX_{(gas)} \rightarrow MX_{n\ (solid)} + (n-2)H_{2(gas)} \quad [2]$$

Where:
M=Transition metal (Mn, Fe, Pt, Pd, Rh, Ru, Ti, Zr, Hf, Co, Ni, Cu, etc),
or alkaline earth metal (Mg, Ca, Ca, Sr, etc),
or metalloid (B, Al, Ga, Sn, Pb, etc),
or lanthanide (La, Ce, Yb, Lu, etc)
or actinide (U, Pu, etc),
X=Halide
n=moles of HX necessary to consume all of M.

EXAMPLE 1

Atmospheric Pressure Method: Anhydrous manganese (II) chloride was prepared as follows:

Manganese powder (50 g, 325 mesh) was placed into a 2000-mL round bottom 3-neck flask equipped with a reflux condenser bearing a dry nitrogen gas by-pass and an addition funnel. The addition funnel was filled with 1000 g of HCl-saturated dimethyl carbitol (DMC) solvent (about 31% HCl at room temperature). The reaction was started with the addition of HCl/DMC solution in a drop wise manner (~18 mL/min). After addition of about 200 mL of the solution to the manganese powder, the reactor was heated to 100° C. If the heating is not done then the reaction temperature plateaus at about 50° C. due to reaction exothermicity, a temperature at which the rate of reaction is very slow. The reaction mass was agitated vigorously while extra HCl was introduced through a bubbler to enhance the reaction rate. The HCl escaping from the reaction mass upon heating and agitation was trapped through a DMC scrubber in order to recover the HCl. The HCl laden DMC from the scrubber can subsequently be recycled into the next batch. The reaction was completed after about 8 hours and the resulting pink solid product in HCl/DMC solution was centrifuged (using centrifuge with a brass basket). The pink solid cake was washed in the centrifuge by spraying fresh DMC solvent to remove the remaining HCl. The wet cake was then dried with rotary evaporation at 150° C. under vacuum to remove all of the solvent. The chemical analysis of the dry solid showed a quantitative yield of manganese (II) chloride.

EXAMPLE 2

Stoichiometric Reaction (addition of Mn powder to "hot" DMC/HCl solution):

In a similar apparatus as that used in Example 1, a sample of manganese (30 g, 325 mesh) was added very slowly (to prevent a possible splashing or vigorous reaction) to 600 mL of "hot" (110 C) DMC/HCl solution initially charged at ambient temperature with a stoichiometric amount of HCl (about 40 g). On heating of the solution, some of the HCl escapes and is trapped in a DMC scrubber. Further HCl escapes and is trapped similarly when the manganese is added to the preheated DMC/HCl solution. The reaction mixture was agitated vigorously (using Talboy Stirrer, model 267-344). After 4 h reaction time all the HCl was consumed but some of the manganese was still unreacted. 100 mL of the mother liquor was decanted into another flask and 18 g of HCl bubbled into it before returning it to the reaction mixture. The reaction continued for another 3 h in order to complete the reaction. The chemical analysis showed no unreacted manganese metal and less than 0.4% HCl remaining in the mother liquor. The remaining acid can be reacted out by further addition of manganese powder, or simply evaporated out. Following the former option results in several hours of additional reaction time before the remaining HCl is consumed. For a good yield on manganese chloride, it is important to keep air and moisture out of the reactor system.

EXAMPLE 3

High Pressure Method:

Anhydrous manganese (II) chloride was prepared using a high pressure (~100 psig) system in order to reduce the reaction time. Manganese powder (26 g, 325 mesh) was slurried with 50 mL DMC. The slurry was transferred into a 1000-mL Hastelloy-c autoclave. The autoclave was equipped with a magnetically coupled double propeller agitator, a heating mantle, a temperature controller, a cooling coil, a vent line and safety rupture disc. DMC/HCl solution (500 g, 400% excess HCl) also transferred into the autoclave via a Hastelloy-c sample tube. The reactor was closed and heated to 100° C. while the pressure was kept below 100 psig by venting the reactor. After 1.5 hours the reactor was cooled to room temperature and the manganese (II) chloride slurry was centrifuged and dried as described in the above method. Chemical analysis of the sample showed similar result to the previous methods described in Examples 1–3 above.

It was found that the high pressure method was the most efficient because it was completed in the shortest time (1.5 hours instead of 8+ hours at ambient). For highest product purity the reaction has to be carried out under an inert atmosphere such as nitrogen, and with water-free solvent. When carried out at ambient pressure as described in two of the examples above it was found that if additional HCl is bubbled through the HCl saturated DMC as reaction with manganese metal is proceeding, then reaction efficiency was improved. Reaction efficiency is also higher if the HCl/DMC solution is preheated as in Example 2 because agglomeration of the reacting manganese is minimized at higher temperatures thus affording a higher metal surface area to the reaction. For improved reaction kinetics, the reaction temperature may be maintained at about 100° C.

Key parameters affecting reaction efficiency are manganese metal particle size and a relatively higher pressure over ambient above the reaction mixture. Table 1 illustrates the reaction rate variability with respect to reaction pressure.

TABLE 1

Effect of Manganese Metal Particle Size on Reaction Efficiency

| Mn Mesh | Pressure (psig) | Reaction Time (Hours) |
| --- | --- | --- |
| >100 | 100 | 3 |
| >100 | ambient | 72 |
| 325 | 100 | 1.5 |
| 325 | ambient | 8 |

Table 2 demonstrates the composition and purity of the $MnCl_2$ cake made by the methods described herein. The quantitative results in Table 2 also highlight the anhydrous nature of the resulting product. There is effectively no water present in the end result product of the processes described herein. For the purposes of definition herein, however, the term "anhydrous" shall mean absence of both free water in the product mix and water of hydration bound on the crystal lattice of the product compound, in recognition of the industrial process realities where at least some small amount of water may be found in the end reaction products.

TABLE 2

Chemical Analytical Data of the $MnCl_2$

| Mn Mesh | Source | Pressure (psig) | Theo. Mn in $MnCl_2$ | % Mn in $MnCl_2$ | % Cl in $MnCl_2$ | % DMC |
| --- | --- | --- | --- | --- | --- | --- |
| 325 | Alfa | ambient | 28.2 | 28.5 | 36.3 | 35 |
| 325 | Aldrich | ambient | 33 | 33.2 | 42.5 | 24 |
| 325 | Alcan | ambient | 27.8 | 27.8 | 35.9 | 36 |
| 325 | Alcan | 100 | 32.8 | 32.9 | 42.3 | 24.8 |

TABLE 2-continued

Chemical Analytical Data of the MnCl$_2$

| Mn Mesh | Source | Pressure (psig) | Theo. Mn in MnCl$_2$ | % Mn in MnCl$_2$ | % Cl in MnCl$_2$ | % DMC |
|---|---|---|---|---|---|---|
| >100 | Kerr-McGee | ambient | 35 | 35 | 45.2 | 19.8 |
| >100 | Kerr-McGee | ambient | 41.6 | 41.7 | 53.7 | 4.6 |
| 200 | Kerr-McGee | ambient | 41.2 | 41.2 | 53.2 | 5.6 |
| >100 | Kerr-McGee | ambient | 32.8 | 33.1 | 42.3 | 24.6 |
| <325 | Alcan | ambient | 19.8 | 19.9 | 25.6 | 54.5 |
| >100 | Kerr-McGee | ambient | 20.2 | 20.2 | 26.2 | 53.2 |
| >100 | Kerr-McGee | ambient | 20.5 | 20.5 | 26.4 | 53.1 |
| >200 | Kerr-McGee | ambient | 43.6 | 43.1 | 56.5 | 0.4 |
| >100 | Kerr-McGee | 100 | 18.4 | 18.4 | 23.8 | 57.8 |

It is to be understood that the reactants and components referred to by chemical name anywhere in the specification or claims hereof, whether referred to in the singular or plural, are identified as they exist prior to coming into contact with another substance referred to by chemical name or chemical type (e.g., solvent, etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together either in performing a desired chemical reaction (such as formation of the metal halide) or in forming a desired composition (such as an intermediate or starting material). Accordingly, even though the claims hereinafter may refer to substances, components and/or ingredients in the present tense ("comprises", "is", etc.), the reference is to the substance, components or ingredient as it existed at the time just before it was first blended or mixed with one or more other substances, components and/or ingredients in accordance with the present disclosure. The fact that the substance, components or ingredient may have lost its original identity through a chemical reaction or transformation during the course of such blending or mixing operations or immediately thereafter is thus wholly immaterial for an accurate understanding and appreciation of this disclosure and the claims thereof.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

Applicant does not intend to dedicate any disclosed embodiments to the public, and to the extent any disclosed modifications or alterations may not literally fall within the scope of the claims, they are considered to be part of the invention under the doctrine of equivalents.

What is claimed is:

1. A method of forming manganese chloride comprising the step of reacting a manganese metal powder with hydrogen chloride under anhydrous reaction conditions, wherein at least some of the hydrogen chloride is dissolved in an ether solvent.

2. A method of forming manganese chloride comprising the step of reacting a manganese metal powder with hydrogen chloride under anhydrous reaction conditions, wherein the solvent is selected from the group consisting of ethers, dimethyl ether (DME), butyl ether, amyl ether, d-n-butyl ether, glyme polyethers, diethylene glycol methyl ether (DGME), triethylene glycol dimethyl ether (triglyme), diethylene glycol dimethyl ether (diglyme), 1,2-dimethoxyethane (glyme), Cetaner (a blend of 96% glyme and 4% dimethoxymethane), ethylene glycol mono-tert-butyl ether, ethylene glycol mono-n-butyl ether, carbonates, dimethyl carbonate, diethyl carbonate, di-acetates, ethylene glycol acetate, acetals, dimethoxymethane (DMM or methyl-al), 2-ethyihexylacetate, esters of plant oils, esters of animal oils, and methyl soyate.

3. A method of forming manganese chloride comprising the steps of:
   providing manganese metal powder;
   providing hydrogen chloride;
   reacting the manganese metal powder with the hydrogen chloride under anhydrous reaction conditions;
   wherein the reaction conditions comprise a reaction temperature in the range of about 50° C. to about 200° C.; and
   further wherein at least some of the hydrogen chloride is dissolved in an ether solvent.

* * * * *